April 17, 1934.  W. T. SIMPSON  1,955,568
CONVECTOR SYSTEM FOR OIL CRACKING
Filed May 29, 1929
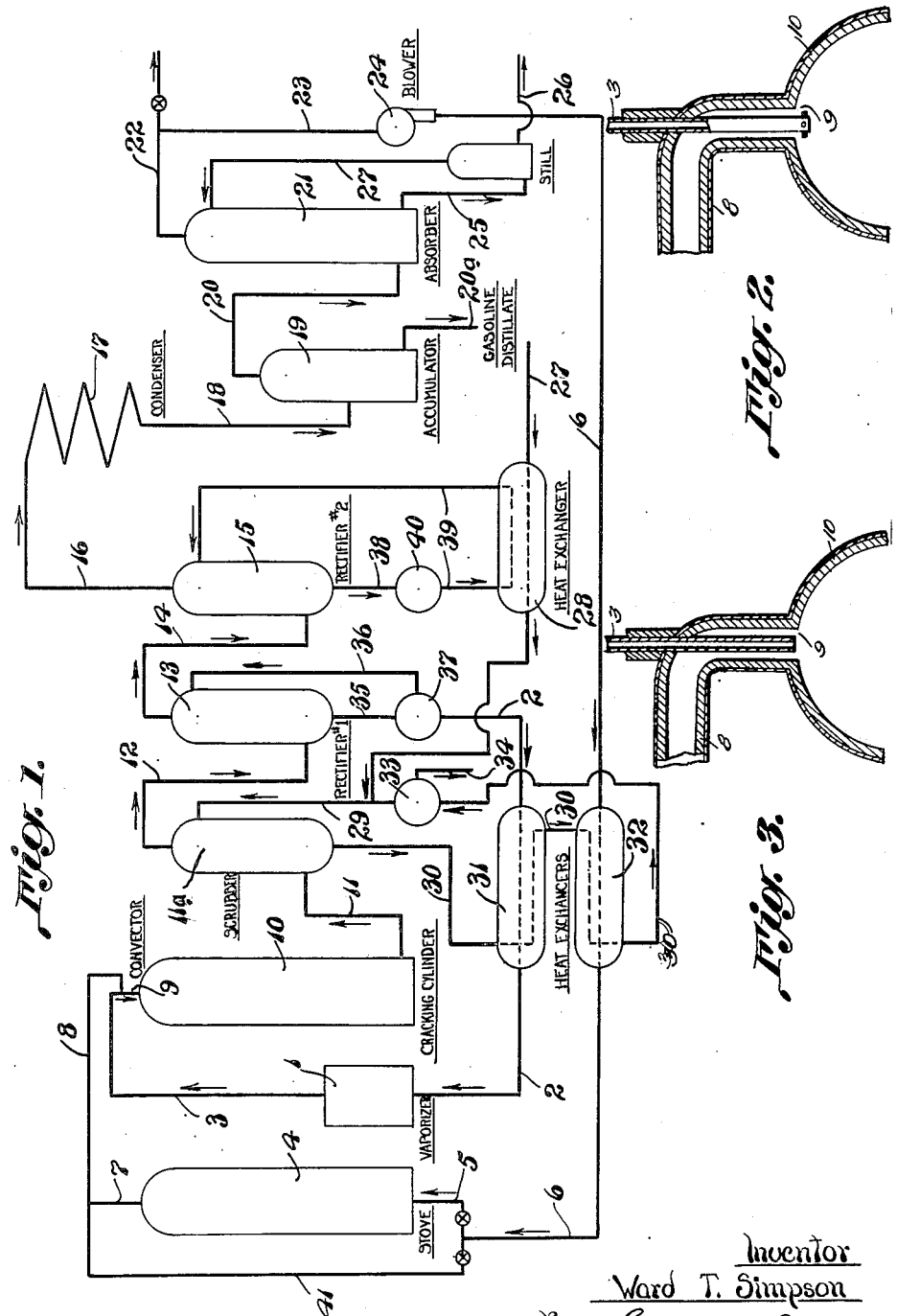
Inventor
Ward T. Simpson
By Liverance and
Van Antwerp
Attorneys Patented Apr. 17, 1934

1,955,568

UNITED STATES PATENT OFFICE 1,955,568

CONVECTOR SYSTEM FOR OIL CRACKING

Ward T. Simpson, Grand Rapids, Mich., assignor, by mesne assignments, to H. Randel Dickinson, Grand Rapids, Mich.

Application May 29, 1929, Serial No. 366,799

4 Claims. (Cl. 196—66)

This invention relates to a process of oil cracking wherein various hydrocarbon compounds of less volatile characteristics than those which, when mixed together, produce gasolene, may be broken down as to their chemical composition and produce gasolene forming hydrocarbon compounds. This breaking down of the less volatile constituents of crude oil or petroleum is known as "cracking", and has been practiced in various ways for a considerable time.

It is known that by applying a proper degree of heat to petroleum the natural constituents thereof which produce gasolene, may be distilled off, but the remaining less volatile constituents must be submitted to cracking in order to obtain the greater percentages of gasolene which it is now necessary to obtain in order to commercially treat petroleum for the best results. Cracking is effected by the application of heat to the heavier and less volatile hydrocarbon compounds of petroleum whereby the same are subjected to high temperatures to break down the same and provide the more volatile gasoline forming hydrocarbons.

The present process is concerned with the application of heat and the attainment of the desired high temperatures through the practically instant mixing of the vapors of said heavier hydrocarbons with a highly heated and high temperature gas, so that the conveying of heat from the gas to the oil vapor is instant and uniform, combined with the passing of said mixed highly heated and high temperature gas and oil vapor through a reaction chamber, permitting a definite and necessary time of reaction for change of the chemical composition of the heavier and less volatile hydrocarbons to the lighter and more volatile compounds from which gasoline is made; and at the same time eliminate any possibility of overcracking or the production of an excess of gaseous hydrocarbons which remain gaseous at normal atmospheric temperatures and pressures.

An understanding of the invention and of the process which I have devised for the attainment of the ends stated may be had from the following description taken in connection with the accompanying drawing, in which, Fig. 1 is a diagrammatic outline illustrative of a unit of an oil refinery for the production of gasoline and by-products from crude petroleum making use of the process which I invented, and Figs. 2 and 3 are fragmentary vertical sections illustrative of forms of mixing convectors which may be used.

The oil, which is to be subjected to the process, is vaporized by the application of heat in any suitable manner at 1, the oil passing to the vaporizer 1 through an inlet pipe 2, and the oil vapor passing outwardly through an outlet pipe 3. The gas, which is to be mixed with the vapor, is heated to a very high degree of temperature in a stove 4, passing thereinto through a pipe 5, which is connected with an inlet pipe 6 for the gas and after it has been heated and raised to the desired temperature, it passes outwardly through a pipe 7, which connects with a pipe 8, it in turn leading to the oil vapor pipe 3 so that the oil vapor and the highly heated gas are intimately mingled and mixed together at 9 where the two are injected into the reaction chamber or cracking cylinder 10 and the mixture having a temperature substantially that used and common and well known in vapor phase oil cracking processes.

The manner in which the oil vapor and the gas may be intimately mixed and commingled, and injected into the cracking receptacle 10 is subject to a wide variation in the specific detail of mechanism used, but in practice an inner pipe carries the oil vapor while the high temperature gas is in a cylindrical pipe around the inner pipe, the velocity of passage of the oil vapor drawing in the gas so that the two are instantly intermixed and are mixed homogeneously to produce a desired controlled temperature substantially at the entrance to the reaction cracking receptacle 10.

The heat from the highly heated and high temperature gas is conveyed by the intimate intermixture thereof with the oil vapor to the molecules of the vapor with a consequent much more uniform reaction occurring in the oil vapor molecules and a breaking down and a change of their chemical composition from the less volatile to the more volatile hydrocarbons. The speed of passage through the cracking receptacle 10 is relatively slow, thus giving the necessary time for reaction.

The intimate and immediate homogeneous intermixture of the oil vapor and the heat carrying gas, as the same are introduced into the cracking chamber is the salient and practically effective feature of the invention which I have made. The transference of heat to the oil vapor by forced convection in the manner stated is one in which the effects of the heat are substantially uniform and the resulting reactions much more uniform by reason of the immediate direct and homogeneous intermixture of the oil vapor and the heat carrying gas; and the results attained are far superior to any other known method of mixing the vapor and gas together.

An example of the temperatures which may be used with my process is as follows: The oil vapors passing thru the pipe 3 from the vaporizing unit, which may have a superheater as an integral part or as an additional unit, would be at a temperature of approximately 700-900° F., and the temperature of the gas passing thru the pipe 8 would be substantially 1400° F., which is approximately the highest uniform temperature that can be maintained economically for long periods of time when heating gas in stoves of the blast furnace type; the gas and oil vapor are suitably proportioned so that the resultant intermixture of oil vapors and highly heated gases have a homogeneous admixture temperature of substantially 1050° F. These temperatures are not fixed essentially at the figures named, but the process is operable at considerable variations from the temperatures named. The particular and specific temperatures before admixture which may be used depend largely upon the design and type of the unit which is used as a source of heat for the gas, temperature of 1600° F. being attainable; the design and type of the vaporizing and superheating units, and the character of the hydrocarbon material being processed. The particular and specific temperatures of admixture depend largely on the predetermined time of reaction element and the products desired to produce, and my invention is not to be limited to any particular specific degree of high temperature, or design, or number of units.

This process of oil cracking is readily adapted for the use with the apparatus now used in an oil refinery for the production of gasoline and byproducts from crude oil and petroleum, and the figure illustrates diagrammatically the manner in which this process may be utilized in practical refinery operations. After the reactions have taken place in the cracking cylinder 10, the products of the reaction in vaporous and gaseous state pass therefrom, through an outlet 11 to a scrubber or rectifier 11a wherein the temperature is reduced. Part of the vapors condense and the others, still in gaseous form, pass outwardly through the outlet pipe 12 to another rectifier 13 wherein there is another reduction in temperature so that some of the vapors first received therein condense and others pass outwardly through the pipe 14 to an additional rectifier 15, at a still lower temperature, wherein all of the vapors which remain at gaseous form at its temperature pass outwardly through the outlet pipe 16, the same being condensed in the condenser 17, lead through a pipe 18 to an accumulator 19, the gasolene distillate passing outwardly through a pipe 20a while all remaining gaseous material passes out through the pipe 20 to the absorber 21 where absorption of light ends takes place but the gas passes outwardly through the pipe 22 and may be led to a gas collecting tank, or be directed wholly or partly through the branch pipe 23 to blower 24 for blowing the gas back through the pipe 6 to the stove 4, for heating the same for entrance, with the vaporized oil, into the cracking cylinder.

The fresh supply of crude oil or petroleum passes through the entrance pipe 27, is heated at 28 and is conducted through a pipe 29 to the upper end of the scrubber 11a. Its more volatile constituents are vaporized and pass outwardly through the pipe 12. Its constituents which remain liquid at the temperature of the scrubber or rectifier 11a settle to the bottom thereof with any other condensed liquids and pass outwardly through an outlet pipe 30.

The liquid in the pipe 30 is at a high temperature and may give off heat at 31 and 32 to the liquid in the pipe 2 and the gas in the pipe 6, coming back to a tank 33 where tar, fuel oil and like residue are removed through the outlet at 34, the residue of liquid mixing with the fresh feed in the pipe 2a on its way to the scrubber 11a. Whatever liquid condenses in the rectifier 13 is carried through an outlet pipe 35 and pumped part of it, through a third pipe 36, to the upper end of the rectifier 13 and the rest through the pipe 2 to the vaporizer while the liquid which condenses in the rectifier 15 is removed through an outlet pipe 38 and pumped back to the upper end of the rectifier 13. The tanks 37 and 40 are conventional storage tanks well known and common in refineries of this type. The pipe at 41, in the normal operation of the plant, is used for temperature regulation of the heated gas in the pipe 8 which leads to the convection mechanism at 9.

With this process it is evident that the volatile hydrocarbons of crude oil or petroleum are removed when the same is introduced into the scrubber 11a, leaving the heavier and less volatile constituents. Those which from a practical commercial standpoint are not to be reduced are removed at 34, while those which are to be cracked are taken from the lower end of the rectifier 13 carried to the vaporizer through pipe 2, and vaporized, and directed into the cracking cylinder and at the same time instantly and homogeneously intermixed with the high temperature heated gas which furnished the heat for the cracking process.

The process described is very practical and satisfactory and has been subjected to thorough and comprehensive practical tests and operation. It greatly reduces the apparatus necessary for cracking and the expense of operating the same and has in every way proved a marked advance in the field of oil cracking.

While the description has been directed specifically to the use of the process of the invention in connection with cracking hydrocarbon compounds, it is to be understood that the intimate immediate homogeneous intermixture of a heat carrying gas with other vapors than hydrocarbon vapors for obtaining desired reactions in said vapors because of heat and high temperature, is comprehended in the present invention and the invention is not to be limited in use to oil cracking alone; but is to be comprehensive in the matter of use within the definition of the invention appearing in the appended claims.

I claim:

1. The process of producing hydrocarbon compounds which consists, in evolving vapor from hydrocarbon liquid, heating a gas at a separate point, conducting the vapor and gas separately to a point adjacent an enlarged reaction chamber and joining the vapor and gas immediately adjacent the entrance to said reaction chamber whereby the velocity of passage of the vapor causes a substantially instant and homogeneous mixture of vapor and heated gas with a projection of said mixture into said reaction chamber, and a rapid rise of temperature of said oil vapor to thereby crack the oil vapor constituents and produce the desired hydrocarbon compounds, and conducting the products thus produced in said reaction chamber from the chamber and reducing the temperature thereof.

2. The herein described process for converting hydrocarbon compounds which consists, in heating said compounds to generate compressed vapor, elsewhere heating a gas to a higher temperature, conducting said vapor and said gas separately to the entrance to a zone of lower pressure wherein, by confluence, the mixture of the vapor and heated gas is substantially instantaneously and homogeneously effected, said mixing being effected by the velocity of the vapor, passing the homogeneous mixture of vapor and gas thus conditioned for reaction through a suitable enlarged reaction chamber, thereafter cooling the products passing from the chamber to essentially terminate reaction, and recovering the products of the reaction produced by condensation.

3. The herein described process of producing hydrocarbons which consists in evolving hydrocarbon vapor from hydrocarbon liquid, separately heating a gas to a temperature above that of the hydrocarbon vapors, conducting said vapor and gas separately to and confluently joining them adjacent an entrance to a suitably enlarged reaction chamber and instantly and homogeneously mixing the same, said mixture being effected by the constituent having the higher velocity, and passing the mixture thus conditioned through the reaction chamber, the heat and high temperature supplied by said heated gas causing dissociation of the hydrocarbons of the vapor to produce other desired hydrocarbons.

4. The herein described process of producing hydrocarbons at high temperature which consists in evolving hydrocarbon vapor from hydrocarbon liquid, separately heating a gas to a desired high temperature, conducting said vapor and gas separately to and confluently joining them adjacent an entrance to a suitably enlarged reaction chamber and instantly heating the vapor to a high cracking temperature without overheating by homogeneously mixing the said gas and vapor, said mixture being effected by the constituent having the higher velocity, and passing the mixture thus conditioned through the reaction chamber, the heat and high temperature supplied by said heated gas causing dissociation of the hydrocarbons of the vapor to produce other desired hydrocarbons.

WARD T. SIMPSON.